US011802801B2

(12) United States Patent
Sinharay et al.

(10) Patent No.: US 11,802,801 B2
(45) Date of Patent: Oct. 31, 2023

(54) SYSTEM AND METHOD FOR MEASURING TEMPERATURE OF MIXED FLUID IN AN ENCLOSED CHAMBER

(71) Applicant: Tata Consultancy Services Limited, Mumbai (IN)

(72) Inventors: Arijit Sinharay, Kolkata (IN); Rajat Kumar Das, Kolkata (IN); Anwesha Khasnobish, Kolkata (IN); Tapas Chakravarty, Kolkata (IN)

(73) Assignee: TATA CONSULTANCY SERVICES LIMITED, Mumbai (IN)

(*) Notice: Subject to any disclaimer, the term of this patent is extended or adjusted under 35 U.S.C. 154(b) by 556 days.

(21) Appl. No.: 17/112,414

(22) Filed: Dec. 4, 2020

(65) Prior Publication Data

US 2021/0215521 A1 Jul. 15, 2021

(30) Foreign Application Priority Data

Dec. 4, 2019 (IN) .............................. 201921050011

(51) Int. Cl.
| | |
|---|---|
| *G01K 3/02* | (2006.01) |
| *G01K 11/22* | (2006.01) |
| *G01K 11/26* | (2006.01) |
| *G01F 1/86* | (2006.01) |
| *G01F 1/66* | (2022.01) |
| *G01F 1/667* | (2022.01) |

(52) U.S. Cl.
CPC .............. *G01F 1/86* (2013.01); *G01F 1/662* (2013.01); *G01F 1/667* (2013.01); *G01K 3/02* (2013.01); *G01K 11/22* (2013.01); *G01K 11/26* (2013.01)

(58) Field of Classification Search
CPC ........... G01K 3/02; G01K 11/22; G01K 11/26
USPC ......................................................... 374/117
See application file for complete search history.

(56) References Cited

U.S. PATENT DOCUMENTS

| | | | |
|---|---|---|---|
| 3,497,803 A | 2/1970 | Fegan, Jr. | |
| 4,762,425 A * | 8/1988 | Shakkottai | G01K 11/24 367/902 |
| 5,402,233 A | 3/1995 | Schultz et al. | |
| 6,039,472 A | 3/2000 | Shlik | |
| 9,746,360 B2 | 8/2017 | DeSilva et al. | |

(Continued)

FOREIGN PATENT DOCUMENTS

WO WO-2011088393 A2 * 7/2011 ............. G01K 11/22

*Primary Examiner* — Mirellys Jagan
(74) *Attorney, Agent, or Firm* — Finnegan, Henderson, Farabow, Garrett & Dunner LLP

(57) ABSTRACT

This disclosure relates to a system and method for measuring average temperature of mixed fluid in an enclosed chamber. Measurement is based on two independent principle as measuring variation in acoustic wave velocity and variation in resistivity that works on a single setup. First principle is based on measuring acoustic wave velocity in a known medium, which is isolated from the surrounding. The system comprises a primary pipe and a secondary pipe, wherein the ends of the pipes reside inside the enclosed chamber. The primary pipe is made out of good conductor of heat and filled with air. Ends of the primary pipe is fitted with a transducers have one transmitter at one end and one receiver at another end. Average temperature of the mixed fluid is measured based on the variations in sound velocity of acoustic wave passed through the primary pipe and resistivity variations of the primary pipe.

9 Claims, 5 Drawing Sheets

(56) References Cited

U.S. PATENT DOCUMENTS

| | | | |
|---|---|---|---|
| 9,752,959 B2 | 9/2017 | DeSilva et al. | |
| 2002/0105999 A1* | 8/2002 | Wallen | G01K 11/24 374/117 |
| 2015/0089950 A1* | 4/2015 | Schuermans | G01K 13/02 60/722 |

* cited by examiner

_US 11,802,801 B2_

SYSTEM AND METHOD FOR MEASURING TEMPERATURE OF MIXED FLUID IN AN ENCLOSED CHAMBER

CROSS-REFERENCE TO RELATED APPLICATIONS AND PRIORITY

This U.S. patent application claims priority under 35 U.S.C. § 119 to Indian application No. 201921050011, filed on Dec. 4, 2019. The entire content of the abovementioned application is incorporated herein by reference.

TECHNICAL FIELD

The disclosure herein generally relates to a field of measuring temperature inside an enclosed chamber and, more particularly, to a system and method for measuring an average temperature of mixed fluid in the enclosed chamber.

BACKGROUND

Estimating an average temperature in an enclosed chamber is a crucial requirement in various industrial applications such as foundries (for boilers or furnaces). Most of the existing arrangements measure the average temperature through manual intervention by inserting a thermocouple sensor. However, the inserted thermocouple sensor reaches out to the periphery of the enclosed chamber and can sample local temperature of a single point only. Besides, thermal camera-based technique looks at radiation spectra to estimate the temperature of the radiating body. However, in gaseous environment, the thermal camera-based technique does not work as it meant for capturing radiation from reflective surfaces and not from gases. In addition, the thermal camera primarily captures the wall temperature of the enclosed chamber (in case no gaseous fumes are present) and not the temperature of the fluid (or gas) inside.

Further, with an acoustic wave arrangement, variation in sound velocity is measured to estimate the medium temperature but one needs to know the exact fluid mixture ratios/concentration. Moreover, the existing acoustic wave arrangements can handle only a limited set of mixtures and cannot be used for an open set, which is a more like a case for Foundries. For example, sound velocity varies with change in medium temperature (i.e. sound velocity in nitrogen at 20 degree Celsius is different from sound velocity in nitrogen at 80 degree Celsius). At the same time sound velocity varies with different mediums at same temperature, (i.e. sound velocity in nitrogen at 23 degree Celsius is different from sound velocity in carbon monoxide at 23 degree Celsius). Hence, by measuring change in sound velocity one cannot tell if this change is due to change in temperature or due to change in medium constituents. Therefore, for an unknown set of medium constituents it is difficult to estimate the medium temperature by observing sound velocity in it.

SUMMARY

Embodiments of the present disclosure provides technological improvements as solutions to one or more of the abovementioned technical problems recognized by the inventors in conventional systems.

In one aspect, a processor-implemented method to measure an average temperature of mixed fluid in an enclosed chamber. It would be appreciated that the present disclosure considers boundaries for boilers or furnace as the enclosed chamber.

The method comprises one or more steps as follows. Herein, at least one ultrasound transducer is operated at one end of the enclosed chamber to produce a flow of an acoustic wave into a primary pipe by exciting at least one ultrasound transmitter in a frequency sweep mode. Wherein, the primary pipe contains air. The acoustic wave from the primary pipe is received at a receiving end of the primary pipe using at least one ultrasound receiver. A constant atmospheric pressure is maintained in the primary pipe by exposing a part to outside through a secondary pipe and the atmospheric pressure is maintained using an airflow meter. One or more variations of the received acoustic wave velocity is computed using a Swept Frequency Acoustic Interferometry (SFAI) measurement principle. It is to be noted that the one or more variations in the frequency of the acoustic wave is recorded considering a constant equilibrium condition is maintained in the primary pipe.

In addition to, one or more variations in a resistivity of the primary pipe is computed using a pre-configured Wheatstone bridge arrangement. It is noted that the resistivity of the primary pipe is not affected by the mixed fluid present in the enclosed chamber. An average temperature of the mixed fluid in the enclosed chamber is measured using the received one or more variations in the frequency of the acoustic wave and computed one or more variations in the resistivity of the primary pipe based on the pre-configured Wheatstone bridge.

In another aspect, a system is configured to measure an average temperature of mixed fluid in an enclosed chamber. The system comprising at least one memory storing a plurality of instructions and one or more hardware processors communicatively coupled with at least one memory. The one or more hardware processors are configured to execute one or more modules comprises of a frequency-computing module, a resistivity-computing module, and a temperature-measuring module. Further, the system comprises a primary pipe, a secondary pipe, at least one ultrasound transducer, at least one ultrasound transmitter, and at least one ultrasound receiver.

The primary pipe of the system is inserted into the enclosed chamber through a chamber wall and the secondary pipe connected with the primary pipe at a perpendicular angle. The at least one ultrasound transducer of the system is configured to operate at one end of the enclosed chamber to produce a flow of an acoustic wave into the primary pipe at a predefined frequency. The at least one ultrasound transmitter is excited in a frequency sweep mode to transmit the acoustic wave from a transmitting end into a primary pipe. It is to be noted that the primary pipe contains air. Further, the at least one ultrasound receiver is configured to receive the transmitted acoustic wave at a receiving end of the primary pipe. It would be appreciated that a constant atmospheric pressure is maintained in the primary pipe by exposing a part to outside through a secondary pipe and the atmospheric pressure is measured using an airflow meter. The frequency computing module of the system is configured to compute one or more variations of the received acoustic wave velocity using a SFAI measurement principle, wherein the one or more variations in the frequency based on equilibrium condition of the primary pipe and the resistivity computing module of the system is configured to compute one or more variations in the resistivity of the primary pipe using a pre-configured Wheatstone bridge arrangement. It is to be noted that the resistivity of the primary pipe is not affected from the mixed fluid present in the enclosed chamber. The temperature-measuring module of the system is configured to measure the average temperature of the mixed fluid in the enclosed chamber using one or more variations in the frequency of the received acoustic wave and one or more variations in the resistivity of the primary pipe based on the Wheatstone bridge.

In yet another embodiment, a non-transitory computer readable medium storing one or more instructions which when executed by a processor on a system cause the processor to perform method is provided. The method comprises one or more steps as follows. Herein, at least one ultrasound transducer is operated at one end of the enclosed chamber to produce a flow of an acoustic wave into a primary pipe by exciting at least one ultrasound transmitter in a frequency sweep mode. Wherein, the primary pipe contains air. The acoustic wave from the primary pipe is received at a receiving end of the primary pipe using at least one ultrasound receiver. A constant atmospheric pressure is maintained in the primary pipe by exposing a part to outside through a secondary pipe and the atmospheric pressure is maintained using an airflow meter. One or more variations of the received acoustic wave velocity is computed using a Swept Frequency Acoustic Interferometry (SFAI) measurement principle. It is to be noted that the one or more variations in the frequency of the acoustic wave is recorded considering a constant equilibrium condition is maintained in the primary pipe.

In addition to, one or more variations in a resistivity of the primary pipe is computed using a pre-configured Wheatstone bridge arrangement. It is noted that the resistivity of the primary pipe is not affected by the mixed fluid present in the enclosed chamber. An average temperature of the mixed fluid in the enclosed chamber is measured using the received one or more variations in the frequency of the acoustic wave and computed one or more variations in the resistivity of the primary pipe based on the pre-configured Wheatstone bridge.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

Figure 1:
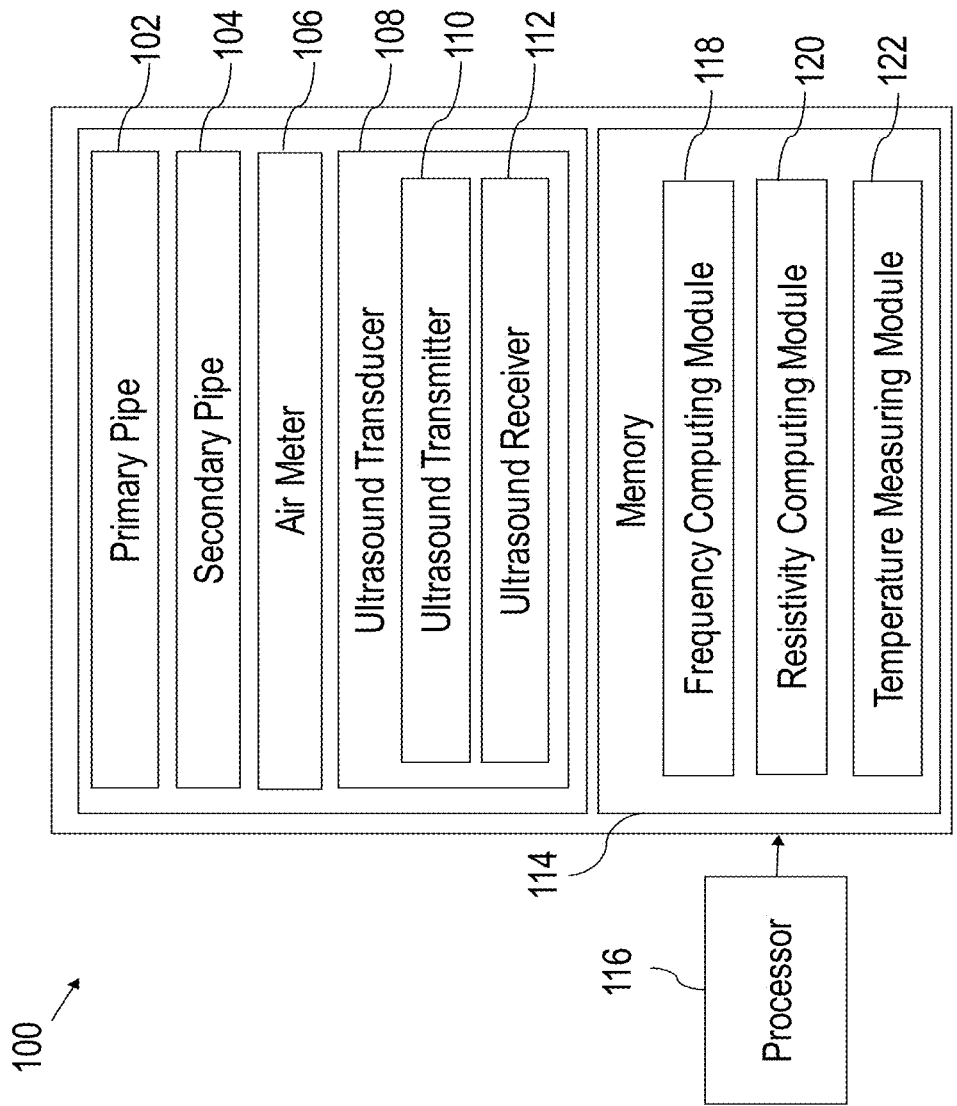
FIG. 1 illustrates a system for measuring an average temperature of mixed fluid in an enclosed chamber, in accordance with some embodiments of the present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes, which may be substantially represented in computer readable medium and so executed by a computer or processor, whether or not such computer or processor is explicitly shown.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments.

The embodiments herein provide a method and a system for measuring temperature of a mixed fluid in an enclosed chamber. For measuring the temperature of the mixed fluid, an ultrasound transmitter and an ultrasound receiver are placed at the two-extreme end of a primary pipe. During the temperature measurement, the pressure of the primary pipe is maintained as equal to an atmospheric pressure. It is to be noted that the primary and secondary pipes are made out of heat conductors with conductivity greater than $1.79*10^7$ S/m, so that the fluid inside the pipes attain same temperature as of mixed fluid within the enclosed chamber. It is to be noted that the resistivity of the pipes must not be affected by mixed fluid within the enclosed chamber. Therefore, the combined acoustic and resistivity-based measurement provides more accurate estimates.

Referring now to the drawings, and more particularly to FIG. 1 through FIG. 5, where similar reference characters denote corresponding features consistently throughout the figures, there are shown preferred embodiments and these embodiments are described in the context of the following exemplary system and/or method.

FIG. 1 illustrates a system (100) for measuring an average temperature of mixed fluid in an enclosed chamber. In the preferred embodiment, the system (100) comprises a primary pipe (102), a secondary pipe (104), an airflow meter (106), at least one ultrasound transducer (108), at least one ultrasound transmitter (110), and at least one ultrasound receiver (112). Further, the system comprises at least one memory (114) with a plurality of instructions and one or more hardware processors (116) which are communicatively coupled with the at least one memory (114) to execute modules therein.

The hardware processor (116) may be implemented as one or more microprocessors, microcomputers, microcontrollers, digital signal processors, central processing units, state machines, logic circuitries, and/or any devices that manipulate signals based on operational instructions. Among other capabilities, the hardware processor (116) is configured to fetch and execute computer-readable instructions stored in the memory (114). Further, the system comprises a frequency-computing module (118), a resistivity-computing module (120), and a temperature-measuring module (122).

In the preferred embodiment of the disclosure, the primary pipe (102) of the system (100) is inserted into the enclosed chamber through a chamber wall. It is to be noted that the both the ends of the primary pipe reside within the enclosed chamber. The primary pipe contains air as a medium and maintains a constant atmospheric pressure by connecting to a secondary pipe, which opens into outside environment. The medium of the primary pipe attains same temperature as of the enclosed chamber. The medium is isolated from the surroundings in a sense that it is not affected by mixed fluid present in the enclosed chamber or by any upward fumes that may be present in the enclosed chamber.

In the preferred embodiment of the disclosure, the secondary pipe (104) of the system (100) is connected with the primary pipe at a perpendicular angle. Herein, the secondary pipe opens up outside of the enclosed chamber. An airflow meter (a.106) is attached with the secondary pipe. The airflow meter (106) monitors equilibrium condition of the system (100) that is depend on the atmospheric pressure and temperature inside of the primary pipe (102).

In the preferred embodiment of the disclosure, the at least one ultrasound transducer (108) of the system (100) is configured to operate at one end of the enclosed chamber to produce a flow of an acoustic wave in the primary pipe at a predefined frequencies. The ultrasound transducer is a piezoelectric based sensor/actuator that expands, or contracts based on applied alternative voltage excitations and vice-versa. Thus, the ultrasound transducer delivers or senses pressure waves. Further, the ultrasound transducer is air coupled and it has special impedance matching layers that maximizes energy transfer from inside a Piezo crystal to outside air medium.

In the preferred embodiment of the disclosure, the at least one ultrasound transmitter (110) of the system (100) is excited in a frequency sweep mode to transmit the acoustic wave into the primary pipe (102), wherein the primary pipe contains air. Frequency sweep is an operation that excites a particular frequency to an actuator i.e. air coupled ultrasound transducer for a specified time and then changes to a different excitation frequency at specified frequency steps. The sweep operation starts from a specified start frequency and stops at a specified end frequency.

Further, the ultrasound receiver (112) of the system (100) configured to receive the acoustic wave velocity from the primary pipe (102). It would be appreciated that a constant atmospheric pressure is maintained in the primary pipe (102).

In the preferred embodiment of the disclosure, the frequency-computing module (118) of the system (100) is configured to compute one or more variations in the frequency of the received acoustic wave using a SFAI measurement principle. The one or more variations in the frequency based on equilibrium condition of the primary pipe (102).

Figure 2:
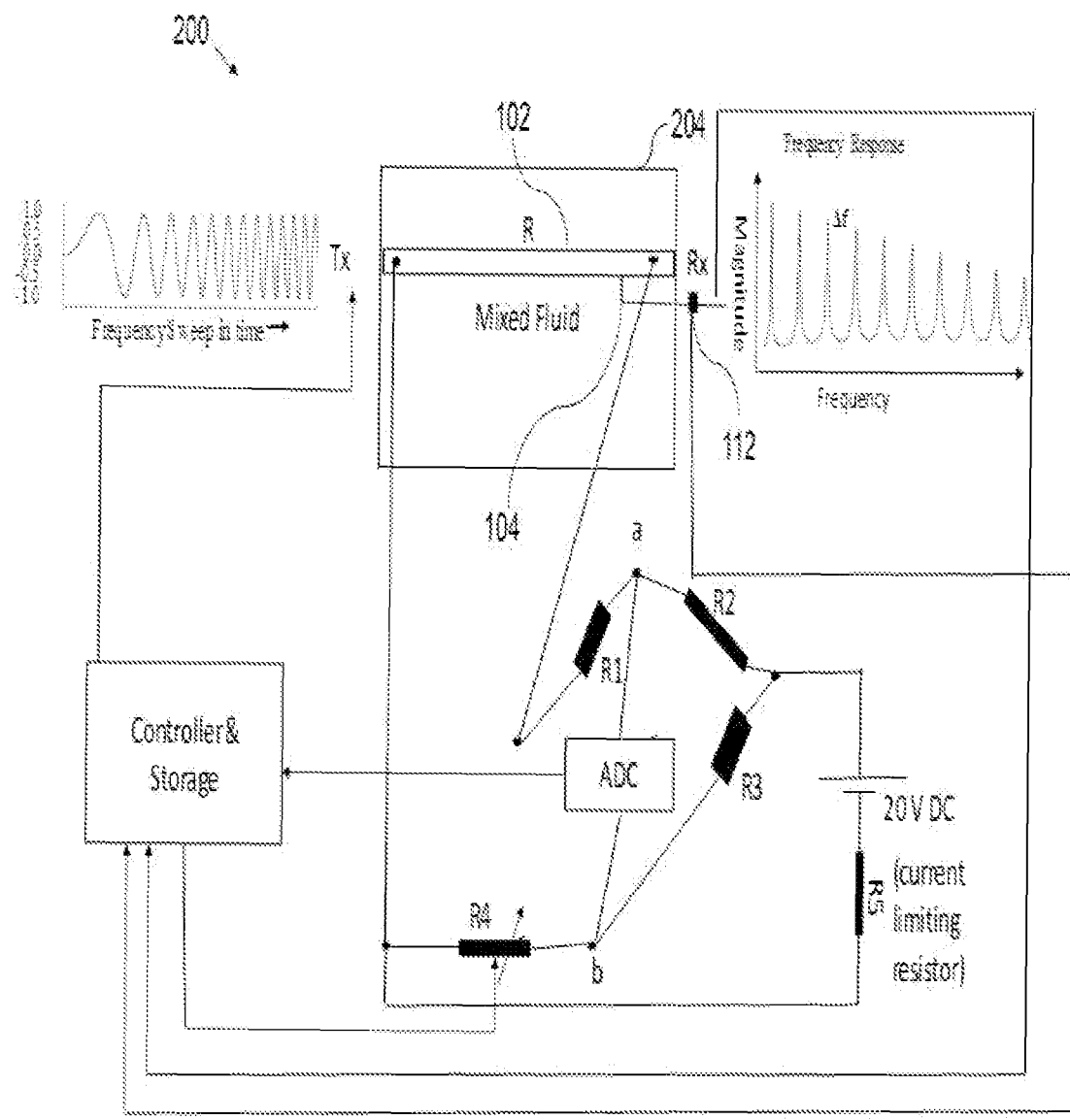
FIG. 2 is a functional block diagram of the system for measuring an average temperature of mixed fluid in an enclosed chamber, in accordance with some embodiments of the present disclosure.

Referring FIG. 2, a functional block diagram (200) of the system (100) for measuring an average temperature of mixed fluid in the enclosed chamber (204). The primary pipe (102) and secondary pipe (104) are fitted within the enclosed chamber (204). Once, the airflow is recorded less than 20 m/s, the system (100) records the airflow value and starts a frequency sweep generator (312) and corresponding resulting spectra is recorded and computed as per standard SFAI measurement principle. A ultrasound transmitter (110) piezo produces discrete acoustic frequencies $\{f1, f2, \ldots fn\}$, one at a time. Each frequency ($f_i$=1, 2, ... n) is kept for 50 ms and for each frequencies of in-phase (I) ADC (306) and Quadrature-phase (Q) ADC (310) signal is recorded. Magnitude (M) from the I and Q signal is calculated as—

$$M=(I2+Q2)^\wedge 0.5 \tag{1}$$

Figure 3:
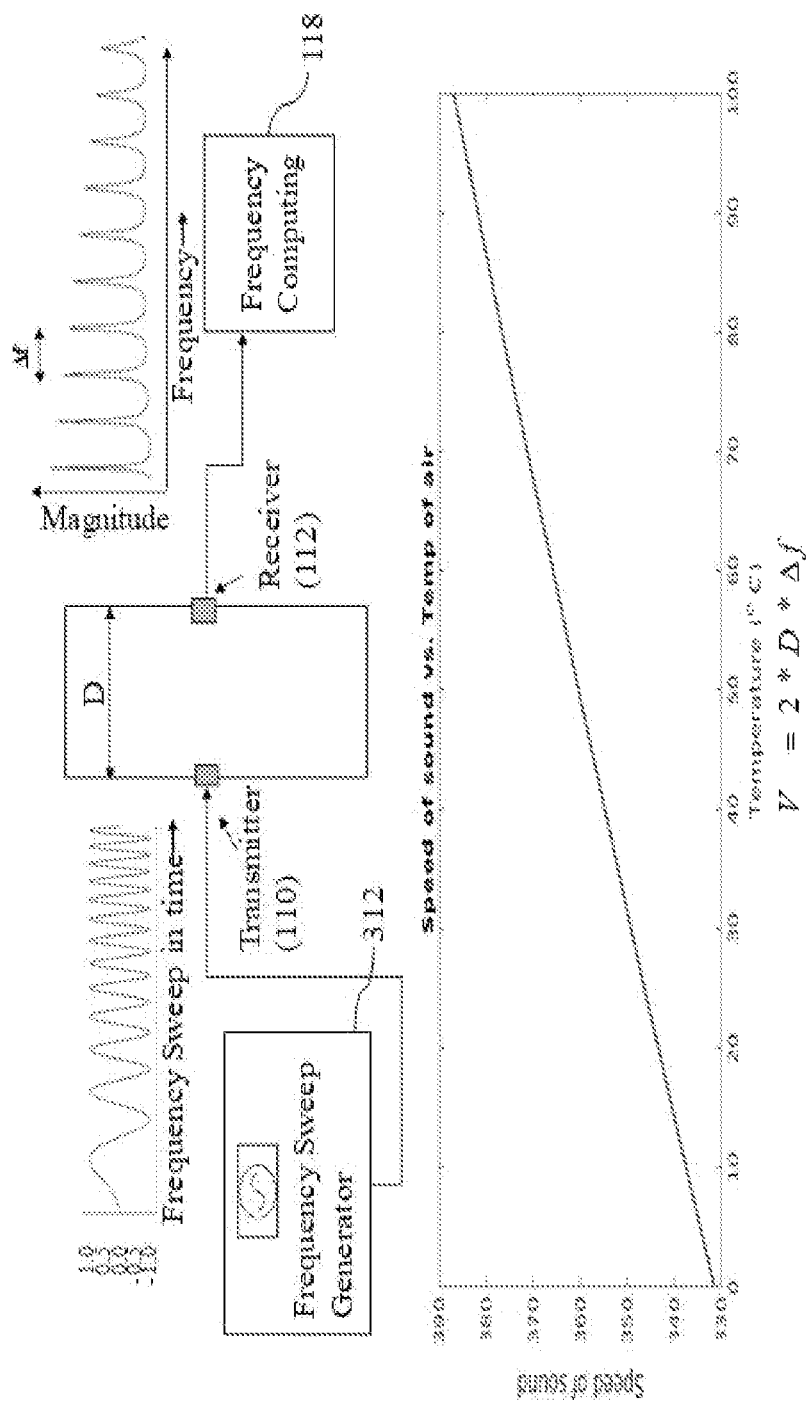
FIG. 3 is a schematic diagram of the system for transmitting and receiving acoustic wave in an enclosed chamber, in accordance with some embodiments of the present disclosure.

Herein, the ultrasound transmitter frequency and corresponding magnitude value of the received signal is stored for each of the frequencies. The ultrasound transmitter frequency and corresponding magnitude value is plotted to observe the resonance spectra. The resonance spectra contain series of resonance peaks. The average value of two consecutive resonance peaks ($\Delta f$) are calculated as shown in FIG. 3. Further, the velocity of the acoustic wave is then calculated as—

$$V=2*D*\Delta f \tag{2}$$

wherein D is the strength of the pipe.

$$T=(V-331.5)/0.6 \tag{3}$$

wherein T is in degree centigrade.

In the preferred embodiment of the disclosure, the resistivity-computing module (120) of the system (100) is configured to compute one or more variations in the resistivity of the primary pipe using a pre-configured Wheatstone bridge arrangement. The resistivity of the primary pipe is not affected from the mixed fluid present in the enclosed chamber. The temperature increases in any metal decreases availability of free electrons that carries electricity and thus the conductivity decreases with increase in temperature due to lack of free electrons in the metal. In other words, the resistivity increases with increase in temperature. For example, in tungsten, the resistivity increases from 5.65 micro-ohm-cm at 0 degree Centigrade to 115 micro-ohm-cm at 3300 degree Centigrade.

In the preferred embodiment of the disclosure, the temperature-measuring module (122) of the system (100) is configured to measure the average temperature of the mixed fluid in the enclosed chamber using one or more variations in the frequency of the received acoustic wave and one or more variations in the resistivity of the primary pipe based on the Wheatstone bridge.

In another aspect, wherein the body of the primary pipe (102) is wired to a Wheatstone bridge configuration as shown in FIG. 2. It would be appreciated that the resistivity of a conductor changes with the change in temperature. Therefore, by measuring the resistance (R) of the primary pipe (102) can be used to estimate the temperature of enclosed chamber. It is to be noted that a digital potentiometer is used in the Wheatstone bridge and the potentiometer is digitally tuned to set the resistance of $R_4$ such the ADC reads almost zero voltage. When this condition is approached, the resistance R is calculated as—

$$R=(R_1*R_3/R_2)-R_4 \tag{4}$$

Now, the resistivity ($\rho$) is calculated as—

$$\rho=R/L \tag{5}$$

wherein, L is the length of the primary pipe. Temperature (T") is then calculated based on the measured resistivity as—

$$\rho=\rho 0(1+\alpha(T''-T^0)) \tag{6}$$

$$T''=[(\rho-\rho 0)/\alpha\rho 0]+T^0 \tag{7}$$

wherein, $\rho 0$ is resistivity at temperature $T^0$ (in centigrade) for the pipe material, alpha ($\alpha$) is also a known co-efficient for the pipe material. So, plugging the value of ρ from equation (6) provides temperature T". Finally, T from equation (3) and T" (7) is weighed averaged to provide average temperature of the enclosed chamber.

In one embodiment, consider a primary pipe of Tungsten having 0.3 meter of inner diameter, 1.5 centimeters of wall thickness and of 9 meters in length is inserted in an enclosed chamber. Herein, the enclosed chamber is cylindrical in geometry, 30 meters in height and 10 meters of diameter. Temperature range can be sustained by 250 degree Celsius to 1200 degree Celsius. The primary pipe reside inside the enclosed chamber. A secondary pipe, which is also made up of Tungsten, having 2 centimeter of inner diameter and 1.5 centimeters of wall thickness. The secondary pipe comes from the primary pipe to outside of the enclosed chamber and opens up in the normal air. The medium inside the primary pipe will attain same temperature of the enclosed chamber but the medium is isolated from the surroundings in a sense that it is not affected by any fluid present in the enclosed chamber or by any upward fumes that may be present in the chamber.

To get most accurate temperature, when the airflow is observed less than 20 m/s, a frequency sweep generator starts, and corresponding resulting spectra is recorded and computed as per standard SFAI measurement principle. The sweep frequency starts (f1) at 10 kHz and stops at (fn) 25 kHz. Each frequency will lasts for 50 milliseconds. For each frequency in-phase (I) signal and quadrature phase (Q) signal is recorded and magnitude (M) from the in-phase and quadrature phase is calculated. The transmitter frequency and corresponding magnitude value of the received signal is stored for all the frequencies.

Figure 4:
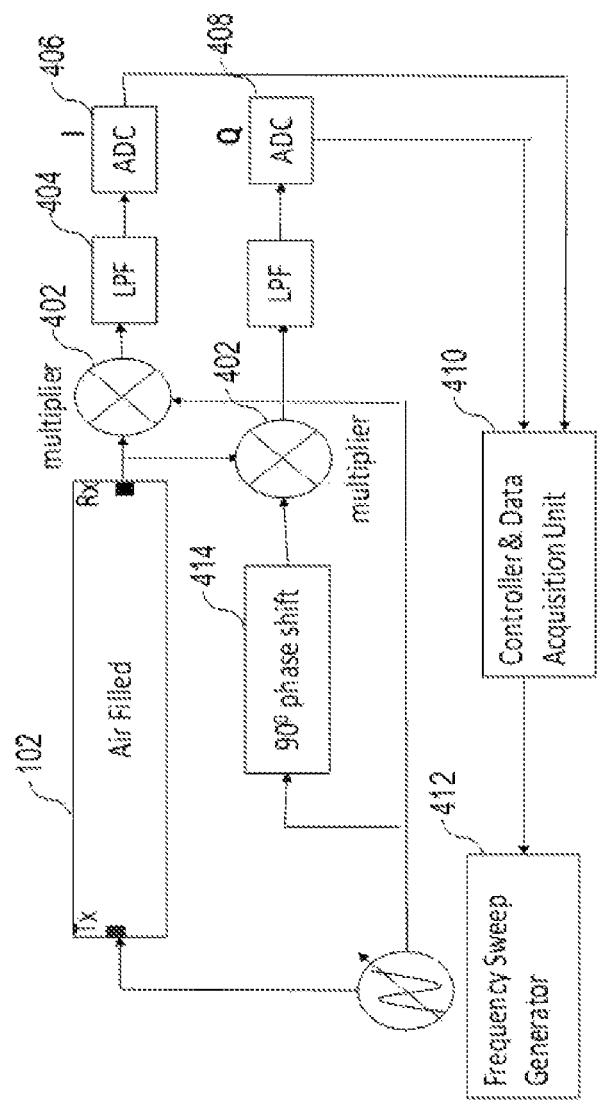
FIG. 4 is a schematic diagram to show variation in frequency of the transmitted acoustic wave at the receiving end, in accordance with some embodiments of the present disclosure.

Referring FIG. 4, wherein the ultrasound transmitter generates one frequency as an excitation signal. The response from the ultrasound receiver is multiplied with the transmitted signal at a multiplier (402) and then a low pass filter (404) is used to filter and digitize. This component is term as in-phase (I) at ADC (406). Simultaneously, the response is also multiplied again with the transmitted signal but with 90-degree phase shift (414). This is then low pass filtered and digitized to form Q at quadrature phase ADC (408). A controller and data acquisition unit (410) gives command to a frequency sweep generator (412) to generate a wide range of frequencies starting from f1 to fn with delf as frequency steps and records the corresponding I and Q values against each excitation frequency.

In another embodiment, the body of the primary pipe is wired to a Wheatstone bridge configuration. The resistivity of any conductor changes with temperature and so by measuring the resistance (R) of the pipe within a range of 1 micro ohm to 50 micro ohm maximum can be used for estimating the temperature of the primary pipe. A potentiometer ($R_4$) of 20 micro ohm with 0.1 micro ohm resolution is used and it is digitally tuned to set the resistance of ($R_4$) such analog to digital (ADC) reads almost zero voltage. Herein, $R_1$ is of 5 micro ohm, $R_2$ and $R_3$ of 50 micro ohm and $R_5$ of 5 Kiloohm as shown in FIG. 2.

Figure 5:
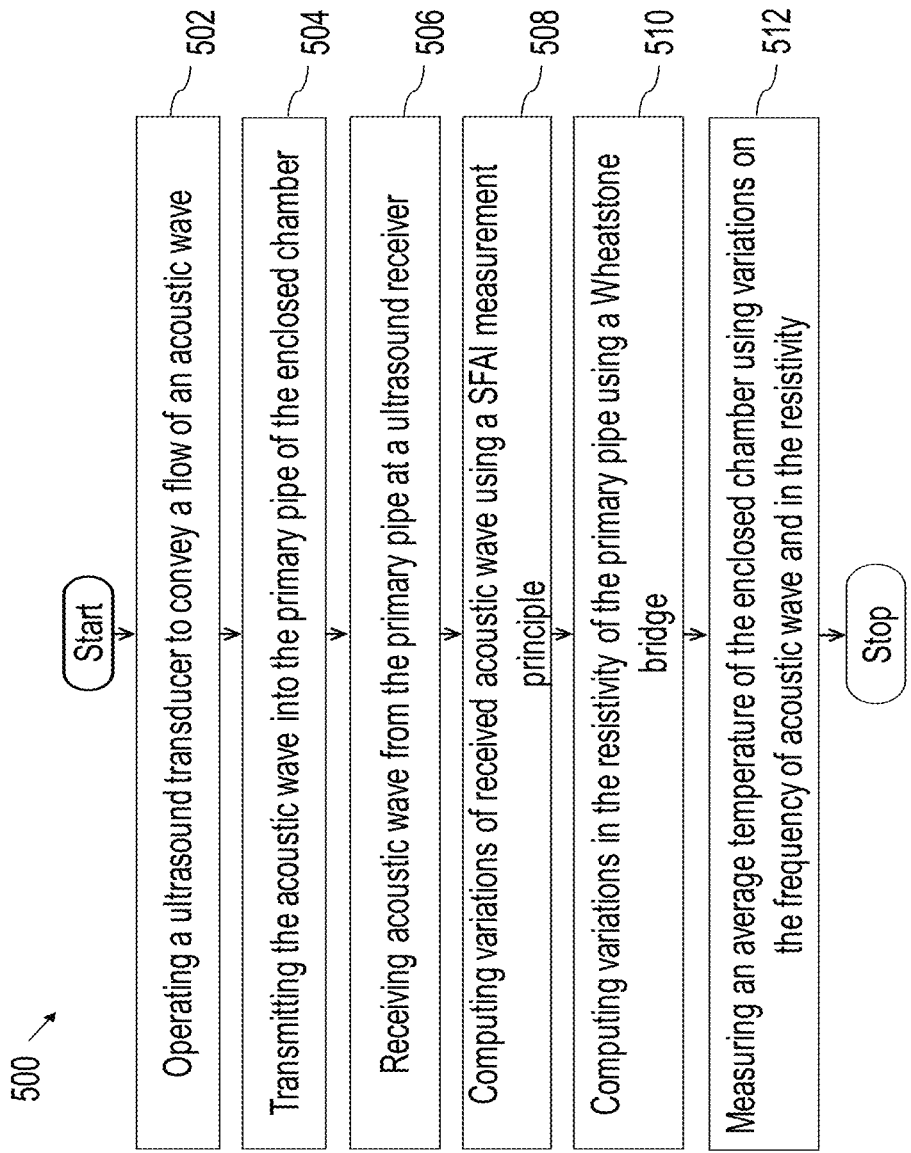
FIG. 5 is a flow diagram to illustrate a method for measuring an average temperature of mixed fluid in an enclosed chamber, in accordance with some embodiments of the present disclosure.

Referring FIG. 5, a processor-implemented method (500) to measure an average temperature of mixed fluid in an enclosed chamber. The method comprises one or more steps as follows.

Initially, at the step (502), operating at least one ultrasound transducer to produce a flow of an acoustic wave into a primary pipe (102) of the system (100) at a predefined frequency. Wherein the equilibrium condition depends on the atmospheric pressure and temperature inside of the primary pipe (102).

In the preferred embodiment of the disclosure, at the next step (504), transmitting, by exciting at least one ultrasound transmitter in a frequency sweep mode, the acoustic wave into the primary pipe (102), wherein the primary pipe (102) contains air.

In the preferred embodiment of the disclosure, at the next step (506), receiving the acoustic wave from the primary pipe (102) using at least one ultrasound receiver (112). A constant atmospheric pressure is maintained in the primary pipe (102) using an airflow meter (106).

In the preferred embodiment of the disclosure, at the next step (508), computing one or more variations of the received acoustic wave using a Swept Frequency Acoustic Interferometry (SFAI) measurement principle, wherein the one or more variations in the frequency based on equilibrium condition of the primary pipe (102).

In the preferred embodiment of the disclosure, at the next step (510), computing one or more variations in a resistivity of the primary pipe (102) using a pre-configured Wheatstone bridge arrangement, wherein the resistivity of the primary pipe (102) is not affected by the mixed fluid present in the enclosed chamber.

In the preferred embodiment of the disclosure, at the last step (512), measuring the average temperature of the mixed fluid in the enclosed chamber using one or more variations in the frequency of the received acoustic wave and one or more variations in the resistivity of the primary pipe (102) based on the Wheatstone bridge.

In another aspect, further comprising a secondary pipe (104) of the system (104) that is connected with the primary pipe (102) at a perpendicular angle and opens up outside of the enclosed chamber. Wherein the airflow meter (106) is attached with the secondary pipe (104) of the system (100).

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem associated with estimating average temperature of mixed fluid in an enclosed chamber. Most of the existing techniques measure through a manual intervention utilizing either thermocouple sensors or thermal cameras. However, in the gaseous environment these techniques do not work. The thermocouple sensors reach only to the periphery of the enclosed chamber and thermal camera captures radiation from the metallic walls of the chamber.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device, which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development would change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A system comprising:
   a primary pipe inserted into an enclosed chamber through a chamber wall;
   a secondary pipe connected with the primary pipe at a perpendicular angle;
   at least one ultrasound transducer configured to operate at one end of the enclosed chamber to produce a flow of an acoustic wave into the primary pipe at a predefined frequency;
   at least one ultrasound transmitter excited in a frequency sweep mode to transmit the acoustic wave from a transmitting end into the primary pipe, wherein the primary pipe contains air;
   at least one ultrasound receiver configured to receive the transmitted acoustic wave at a receiving end of the primary pipe, wherein a constant atmospheric pressure is maintained in the primary pipe using an air-flow meter;
   at least one memory storing a plurality of instructions; and
   one or more hardware processors communicatively coupled with the at least one memory, the at least one ultrasound transducer, the at least one ultrasound transmitter, and the at least one ultrasound receiver, wherein the one or more hardware processors are configured to execute the plurality of instructions to:
      compute one or more variations of the received acoustic wave using a SFAI measurement principle, wherein the one or more variations in frequency is based on an equilibrium condition of the primary pipe;
      compute one or more variations in a resistivity of the primary pipe (102) using a pre-configured Wheatstone bridge arrangement; and
      measure an average temperature of a mixed fluid in the enclosed chamber using the computed one or more variations in a frequency of the received acoustic wave and the computed one or more variations in the resistivity of the primary pipe.

2. The system of claim 1, wherein the secondary pipe opens up outside of the enclosed chamber.

3. The system of claim 1, wherein the air-flow meter is attached with the secondary pipe.

4. The system of claim 1, wherein the equilibrium condition depends on atmospheric pressure and temperature inside of the primary pipe.

5. A processor-implemented method comprising:
   operating, via one or more hardware processors, at least one ultrasound transducer to produce a flow of an acoustic wave into a primary pipe of a system at a predefined frequency;
   transmitting, by exciting at least one ultrasound transmitter in a frequency sweep mode, the acoustic wave from a transmitting end into the primary pipe, wherein the primary pipe contains air;
   receiving, via the one or more hardware processors, the transmitted acoustic wave at a receiving end of the primary pipe using at least one ultrasound receiver, wherein a constant atmospheric pressure is maintained in the primary pipe using an air-flow meter;
   computing, via the one or more hardware processors, one or more variations in a frequency of the received acoustic wave using a Swept Frequency Acoustic interferometry (SFAI) measurement principle, wherein the one or more variations in the frequency of the acoustic wave is based on an equilibrium condition of the primary pipe;
   computing, via the one or more hardware processors, one or more variations in a resistivity of the primary pipe using a pre-configured Wheatstone bridge arrangement; and
   measuring, via the one or more hardware processors, an average temperature of a mixed fluid in an enclosed chamber using the computed one or more variations in the frequency of the acoustic wave and the computed one or more variations in the resistivity of the primary pipe.

6. The processor-implemented method claimed of claim 5, further comprising a secondary pipe connected with the primary pipe at a perpendicular angle and opening up outside of the enclosed chamber.

7. The processor-implemented method of claim 5, wherein the air-flow meter is attached with the secondary pipe.

8. The processor-implemented method claimed of claim 5, wherein the equilibrium condition depends on the atmospheric pressure and temperature inside of the primary pipe.

9. A non-transitory computer readable medium storing one or more instructions which when executed by a processor on a system, cause the processor to perform a method comprising:

operating, via one or more hardware processors, at least one ultrasound transducer to produce a flow of an acoustic wave into a primary pipe of a system at a predefined frequency;

transmitting, by exciting at least one ultrasound transmitter in a frequency sweep mode, the acoustic wave from a transmitting end into the primary pipe, wherein the primary pipe contains air;

receiving, via the one or more hardware processors, the transmitted acoustic wave at a receiving end of the primary pipe using at least one ultrasound receiver, wherein a constant atmospheric pressure is maintained in the primary pipe using an air-flow meter;

computing, via the one or more hardware processors, one or more variations in a frequency of the received acoustic wave using a Swept Frequency Acoustic interferometry (SFAI) measurement principle, wherein the one or more variations in the frequency of the acoustic wave is based on an equilibrium condition of the primary pipe;

computing, via the one or more hardware processors, one or more variations in a resistivity of the primary pipe using a pre-configured Wheatstone bridge arrangement; and measuring, via the one or more hardware processors, an average temperature of a mixed fluid in an enclosed chamber using the computed one or more variations in the frequency of the acoustic wave and the computed one or more variations in the resistivity of the primary pipe.

* * * * *